United States Patent
Yamamoto et al.

(10) Patent No.: US 9,957,187 B2
(45) Date of Patent: May 1, 2018

(54) BRITTLE PLATE PROCESSING METHOD AND BRITTLE PLATE PROCESSING APPARATUS

(71) Applicant: Asahi Glass Company, Limited, Chiyoda-ku (JP)

(72) Inventors: Takashi Yamamoto, Chiyoda-ku (JP); Toshiyuki Ishibashi, Chiyoda-ku (JP); Mitsuhiko Endo, Chiyoda-ku (JP); Masashi Kasajima, Chiyoda-ku (JP)

(73) Assignee: Ashi Glass Company, Limited, Chiyoda-ku (JP)

( * ) Notice: Subject to any disclaimer, the term of this patent is extended or adjusted under 35 U.S.C. 154(b) by 123 days.

(21) Appl. No.: 15/176,374

(22) Filed: Jun. 8, 2016

(65) Prior Publication Data
US 2016/0280578 A1    Sep. 29, 2016

Related U.S. Application Data (63) Continuation of application No. PCT/JP2014/083131, filed on Dec. 15, 2014.

(30) Foreign Application Priority Data

Dec. 27, 2013 (JP) ................... 2013-273332

(51) Int. Cl.
   *C03B 33/033* (2006.01)
   *C03B 33/037* (2006.01)
   *B28D 5/00* (2006.01)

(52) U.S. Cl.
   CPC .......... *C03B 33/033* (2013.01); *B28D 5/0011* (2013.01); *B28D 5/0052* (2013.01); *C03B 33/037* (2013.01)

(58) Field of Classification Search
   CPC ... C03B 33/033; C03B 33/037; B28D 5/0052; B28D 5/0011
   See application file for complete search history.

(56) References Cited

U.S. PATENT DOCUMENTS

| | | | |
|---|---|---|---|
| 787,122 A * | 4/1905 | Semmer | C03B 33/033 |
| | | | 225/2 |
| 2,259,765 A * | 10/1941 | Morris | C03B 33/033 |
| | | | 225/93 |

(Continued)

FOREIGN PATENT DOCUMENTS

| | | |
|---|---|---|
| CN | 101663246 A | 3/2010 |
| JP | 11-79770 | 3/1999 |

(Continued)

OTHER PUBLICATIONS

International Search Report dated Mar. 17, 2015 in PCT/JP2014/083131, filed on Dec. 15, 2014 ( with English Translation).

(Continued)

*Primary Examiner* — Sean Michalski
(74) *Attorney, Agent, or Firm* — Oblon, McClelland, Maier & Neustadt, L.L.P.

(57) ABSTRACT

A brittle plate processing method includes having a first portion of a brittle plate supported flat on a flat part of a support member that supports a first surface of the brittle plate, pressing a cutter against a second surface of the brittle plate opposite to the first surface, and forming a scribe line in the second surface of the brittle plate by moving the cutter and the support member relative to each other. In pressing the cutter, the cutter is pressed to a predetermined position on a second portion of the brittle plate other than the first portion. When the cutter is pressed to the predetermined position on the second portion of the brittle plate, the shape (Continued)

of the brittle plate due to bending deformation is defined by a defining part of the support member.

14 Claims, 5 Drawing Sheets

(56) References Cited

U.S. PATENT DOCUMENTS

| | | | | | |
|---|---|---|---|---|---|
| 2,756,545 | A | * | 7/1956 | Atkeson | C03B 33/027 225/2 |
| 3,743,149 | A | * | 7/1973 | Groppe | C03B 33/03 225/2 |
| 4,247,031 | A | * | 1/1981 | Pote | B26F 3/002 225/2 |
| 4,595,132 | A | * | 6/1986 | Abel | C03B 33/033 225/103 |
| 5,069,195 | A | * | 12/1991 | Barozzi | B28D 5/0023 125/23.01 |
| 5,110,340 | A | * | 5/1992 | Ikola | C03B 33/033 225/103 |
| 5,165,585 | A | * | 11/1992 | Lisec | C03B 33/033 225/105 |
| 5,297,710 | A | * | 3/1994 | Juras | C03B 33/033 225/105 |
| 7,985,458 | B2 | * | 7/2011 | Matsusaki | B28D 5/0011 428/156 |
| 8,220,685 | B1 | * | 7/2012 | Lindsey, Jr. | B26F 3/002 225/93 |
| 8,593,612 | B2 | * | 11/2013 | Lee | C03B 33/037 349/187 |
| 2003/0155391 | A1 | * | 8/2003 | Chae | G02F 1/133351 225/2 |
| 2004/0074366 | A1 | * | 4/2004 | Choo | C03B 33/03 83/886 |
| 2004/0212774 | A1 | * | 10/2004 | Yamazaki | C03B 33/033 349/187 |
| 2006/0285064 | A1 | * | 12/2006 | Lee | C03B 33/037 349/187 |
| 2007/0111483 | A1 | * | 5/2007 | Maruyama | B23K 26/0057 438/464 |
| 2008/0299745 | A1 | * | 12/2008 | Morikazu | B28D 5/0011 438/463 |
| 2009/0014425 | A1 | * | 1/2009 | Zuehlke | C03B 33/033 219/121.72 |
| 2009/0014492 | A1 | * | 1/2009 | Haase | B28D 5/0011 225/93.5 |
| 2009/0050661 | A1 | * | 2/2009 | Na | B26F 3/002 225/2 |
| 2010/0011927 | A1 | * | 1/2010 | Lee | B26D 3/08 83/100 |
| 2011/0107894 | A1 | * | 5/2011 | Maekawa | B24B 9/10 83/869 |
| 2011/0126593 | A1 | * | 6/2011 | Abdul-Rahman | C03B 33/0215 65/97 |
| 2012/0241488 | A1 | * | 9/2012 | Kang | B26F 3/002 225/2 |
| 2013/0341372 | A1 | * | 12/2013 | Lee | C03B 33/033 225/2 |
| 2014/0001679 | A1 | * | 1/2014 | Okuma | B23K 26/0057 264/400 |
| 2015/0284284 | A1 | * | 10/2015 | Konishi | C03B 33/03 65/105 |
| 2015/0340661 | A1 | * | 11/2015 | Sakamoto | C03C 15/02 438/28 |
| 2016/0064229 | A1 | * | 3/2016 | Kim | B23K 26/0057 225/2 |
| 2016/0163907 | A1 | * | 6/2016 | Gonzalez | H01L 31/18 156/708 |
| 2016/0260865 | A1 | * | 9/2016 | Peddada | B28D 5/0011 |
| 2016/0280578 | A1 | * | 9/2016 | Yamamoto | C03B 33/033 |
| 2016/0280579 | A1 | * | 9/2016 | Yamamoto | B28D 1/222 |
| 2017/0217818 | A1 | * | 8/2017 | Dumenil | C03B 33/04 |

FOREIGN PATENT DOCUMENTS

| | | |
|---|---|---|
| JP | 2009-227550 | 10/2009 |
| JP | 2011-231011 | 11/2011 |
| WO | WO 2008/126501 A1 | 10/2008 |

OTHER PUBLICATIONS

Written Opinion dated Mar. 17, 2015 in PCT/JP2014/083131, filed on Dec. 15, 2014.

* cited by examiner

BRITTLE PLATE PROCESSING METHOD AND BRITTLE PLATE PROCESSING APPARATUS

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2014/083131, filed on Dec. 15, 2014 and designating the U.S., which claims priority to Japanese Patent Application No. 2013-273332, filed on Dec. 27, 2013. The entire contents of the foregoing applications are incorporated herein by reference.

BACKGROUND OF THE INVENTION

1. Field of the Invention

The present invention relates to brittle plate processing methods and brittle plate processing apparatuses.

2. Description of the Related Art

The brittle plate processing method includes a cutting process and a bending process. In the cutting process, a scribe line is formed in a top surface of a brittle plate. In the bending process, the brittle plate is broken along the scribe line. Examples of brittle plates include glass plates.

In the cutting process, a cutter that is pressed against the top surface of the brittle plate and a stage on which the entire bottom surface of the brittle plate is supported flat are moved relative to each other. As a result, a scribe line is formed in the top surface of the brittle plate (see, for example, Japanese Laid-Open Patent Application No. 2011-231011).

SUMMARY OF THE INVENTION

According to an aspect of the present invention, a brittle plate processing method includes having a first portion of a brittle plate supported flat on a flat part of a support member that supports a first surface of the brittle plate, pressing a cutter against a second surface of the brittle plate opposite to the first surface, and forming a scribe line in the second surface of the brittle plate by moving the cutter and the support member relative to each other. In pressing the cutter, the cutter is pressed to a predetermined position on a second portion of the brittle plate other than the first portion. When the cutter is pressed to the predetermined position on the second portion of the brittle plate, the shape of the brittle plate due to bending deformation is defined by a defining part of the support member.

DESCRIPTION OF THE EMBODIMENTS

When the cutter is pressed against the top surface of the brittle plate, a crack substantially perpendicular to the top surface of the brittle plate (a so-called median crack) is formed from the edge of the cutter that bites the top surface of the brittle plate. The median crack is used as a scribe line. In addition, a crack substantially parallel to the top surface of the brittle plate (a so-called lateral crack) may be formed from the edge of the cutter that bites the top surface of the brittle plate. The lateral crack becomes a defect.

In order to prevent the occurrence of a defect, there is an upper limit to a force to press the cutter. This results in a shallow scribe line, which has made it difficult to form a section perpendicular to the top surface of the brittle plate along the scribe line in some cases.

According to an aspect of the present invention, a brittle plate processing method capable of forming a deep scribe line is provided.

Embodiments of the present invention are described below with reference to the drawings. In the drawings, the same or a corresponding configuration is designated by the same or a corresponding reference character, and a description thereof is omitted. In the following description, "to" that indicates a range of numerical values means a range that includes a numerical value preceding "to" and a numerical value succeeding "to."

First Embodiment

Figure 1:
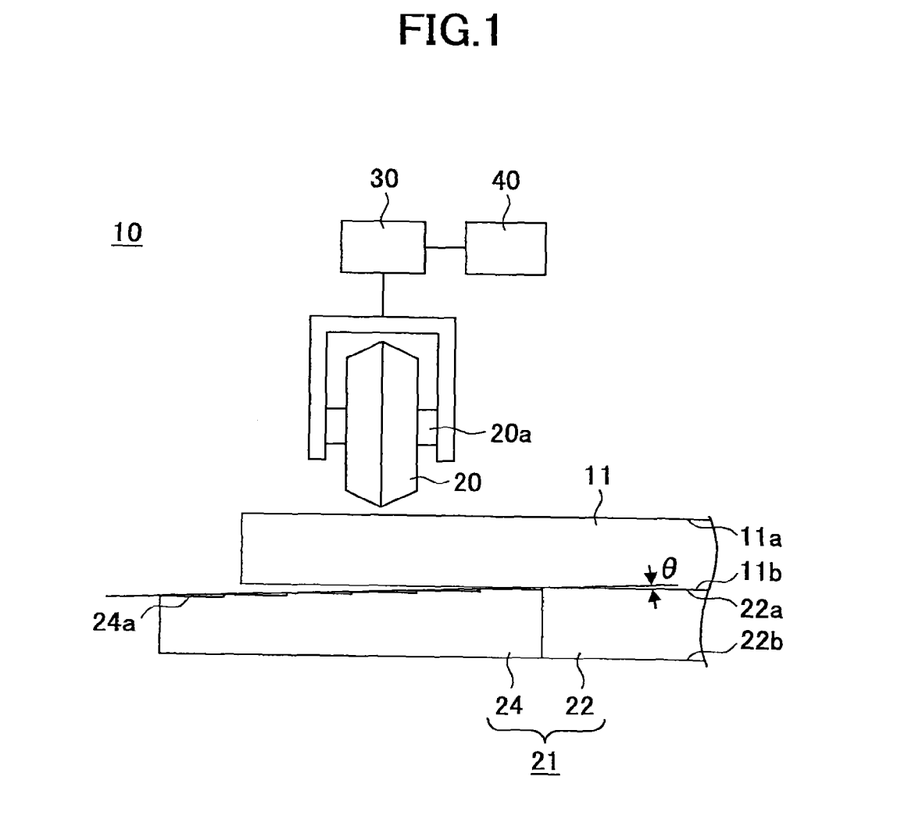
FIG. 1 is a diagram showing a glass plate processing apparatus according to a first embodiment of the present invention, showing a state before pressing a cutter.
Figure 2:
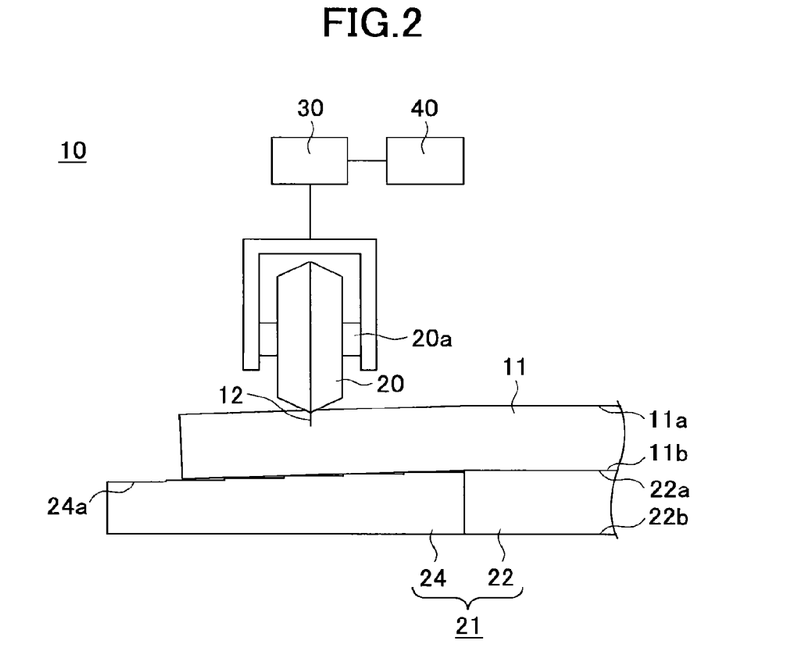
FIG. 2 is a diagram showing the glass plate processing apparatus according to the first embodiment of the present invention, showing a state when the cutter is pressed.

FIG. 1 is a diagram showing a glass plate processing apparatus according to a first embodiment of the present invention, showing a state before pressing a cutter. FIG. 2 is a diagram showing the glass plate processing apparatus according to the first embodiment of the present invention, showing a state when the cutter is pressed.

A glass plate processing apparatus 10 includes a cutter 20 that is pressed against a top surface 11a of a glass plate 11, a template 21 that serves as a support member that supports a bottom surface 11b of the glass plate 11, a movement unit 30 that moves the cutter 20 and the template 21 relative to each other, and a controller 40 that controls the movement unit 30. The movement unit 30 is a common one, and accordingly, a description thereof is omitted. The controller 40 includes, for example, a storage part, such as a memory, and a CPU (Central Processing Unit), and controls the movement unit 30 by causing the CPU to execute a program stored in the storage part. It is possible to control the position of a scribe line 12.

The cutter 20 is pressed against the top surface 11a of the glass plate 11 to be moved relative to the glass plate 11, thereby forming the scribe line 12 in the top surface 11a of the glass plate 11. The cutter 20, which is, for example, a wheel cutter, is rotatable on a rotating shaft 20a, and has a blade at the periphery. When the cutter 20 is moved relative to the glass plate 11 while the periphery of the cutter 20 is pressed against the top surface 11a of the glass plate 11, the cutter 20 forms the scribe line 12 while rotating on the rotating shaft 20a.

The cutter 20 according to this embodiment, which is a wheel cutter that rotates when forming the scribe line 12, may alternatively be a point cutter that does not rotate when forming the scribe line 12. The point cutter has a blade at the tip.

The template 21 supports the bottom surface 11b of the glass plate 11. The template 21 may contact the bottom surface 11b of the glass plate 11. The template 21 does not have to contact the bottom surface 11b of the glass plate 11, and may support the bottom surface 11b of the glass plate 11 through an intermediate member. Examples of intermediate members include a belt conveyor that conveys the glass plate 11.

The template 21 may support the bottom surface 11b of the glass plate 11 by vacuum suction or may support the bottom surface 11b of the glass plate 11 by friction. The method of supporting the glass plate 11 with the template 21 is not limited in particular.

The template 21 includes a flat part 22 and a defining part 24. The flat part 22 includes a flat surface 22a on which a portion of the glass plate 11 is supported flat. A surface 22b of the flat part 22 opposite to the flat surface 22a does not have to be a flat surface.

The defining part 24 defines the shape of the glass plate 11 due to bending deformation when the cutter 20 is pressed to a predetermined position on the rest of the glass plate 11. The bending deformation of the glass plate 11 is deformation in which the outer edge of the flat surface 22a serves as a bending support.

Because of the bending deformation of the glass plate 11, a tensile stress acts on the scribe line 12 behind the cutter 20 in its moving direction, so that the scribe line 12 opens to become deeper. Furthermore, because the bending deformation of the glass plate 11 is restricted by the defining part 24, it is possible to prevent breakage of the glass plate 11.

The defining part 24 includes a defining surface 24a that does not support the bottom surface 11b of the glass plate 11 before the cutter 20 is pressed and supports the bottom surface 11b of the glass plate 11 when the cutter 20 is pressed. The defining part 24 defines the shape of the glass plate 11 due to bending deformation by the shape of the defining surface 24a.

As shown in FIG. 1, the defining surface 24a is apart from a plane including the flat surface 22a in a downward direction from the plane. The defining surface 24a may be stepped. The template 21 can be manufactured by laterally arranging multiple blocks of different sizes. The template 21 can also be manufactured by vertically stacking multiple plates of different sizes. In either case, the manufacturing cost of the template 21 is low. The defining surface 24a may alternatively be gently sloped. There only has to be a space between the glass plate 11 and the defining surface 24a before the cutter 20 is pressed.

The inclination angle θ of the defining surface 24a relative to the flat surface 22a is, for example, 0.3° to 5°. Here, the inclination angle θ refers to the angle between the flat surface 22a and a straight line passing through the outer edge of the flat surface 22a and the outer edge of the defining surface 24a in a section perpendicular to the outer edge of the flat surface 22a. When the inclination angle θ is 0.3° or more, it is possible to sufficiently increase a tensile stress that acts on the scribe line 12 behind the cutter 20 in its moving direction without making the template 21 unnecessarily large. Furthermore, when the inclination angle θ is 5° or less, it is possible to ensure a large width of the defining surface 24a, so that it is possible to accommodate various shapes of the glass plate 11 and to form the scribe line 12 that is substantially perpendicular to the top surface 11a of the glass plate 11. The inclination angle θ is preferably 0.5° or more and 4° or less.

The rotating shaft 20a of the cutter 20 may be inclined relative to the flat surface 22a so that the scribe line 12 is substantially perpendicular to the top surface 11a.

Figure 3:
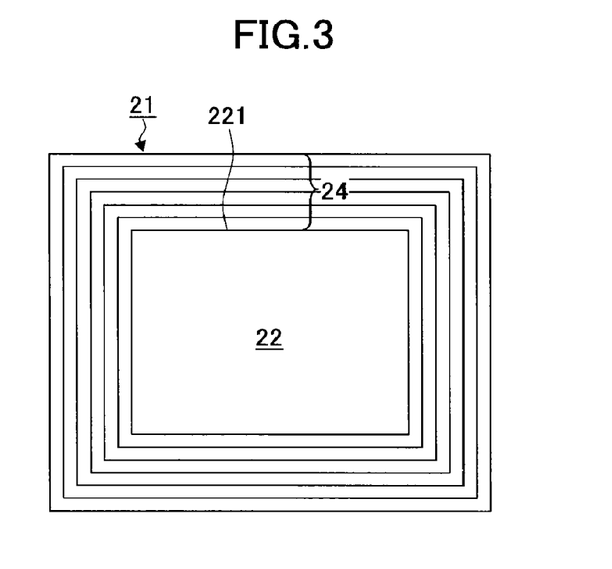
FIG. 3 is a plan view of a template according to the first embodiment of the present invention.

FIG. 3 is a plan view of a template according to the first embodiment of the present invention. As shown in FIG. 3, the defining part 24 may surround the outer edge of the flat part 22. It is possible to form multiple kinds of scribe lines 12 of different shapes with the single template 21. The multiple kinds of scribe lines 12 only have to be somewhat of the same size, and may be scribe lines for, for example, sheets of window glass of the same attachment position for different types of vehicles.

Figure 4:
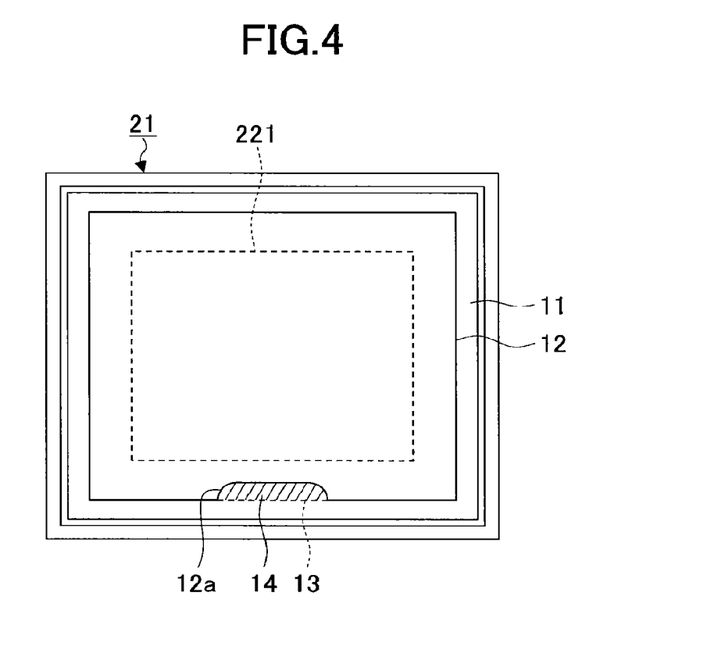
FIG. 4 is a plan view showing the positional relationship between the template shown in FIG. 3 and a scribe line.

FIG. 4 is a plan view showing the positional relationship between the template shown in FIG. 3 and a scribe line. In FIG. 4, an outer edge 221 of the flat surface 22a is indicated by a dashed line.

As shown in FIG. 4, the scribe line 12 is closed, and a product is taken out from inside the scribe line 12. The scribe line 12 may include a concave portion 12a that curves inward. This concave portion 12a is commonly referred to as an incurve. Of the glass plate 11, a removal portion (a portion indicated by falling diagonal strokes from top right to bottom left in FIG. 4) 14 surrounded by the concave portion 12a and a straight line 13 connecting both ends of the concave portion 12a is removed after breakage, and does not form part of a product.

The scribe line 12 according to this embodiment, which is closed, does not have to be closed. The concave portion 12a of the scribe line 12 may be any line that curves toward the flat part 22 in a plan view.

According to this embodiment, the scribe line 12 is deep, so that it is possible to reduce a load applied to the glass plate 11 when the glass plate 11 is broken. Therefore, in the case of dividing into multiple regions and breaking the removal portion 14, it is possible to reduce the number of scribe lines that separate the multiple regions. It is also possible to break the removal portion 14 without dividing the removal portion 14 into multiple regions.

As shown in FIG. 4, the outer edge 221 of the flat surface 22a may have only at least one of an outward curved portion and a straight portion (a straight portion according to this embodiment), and does not have to have an inward curved portion. That is, the outer edge 221 of the flat surface 22a does not have to have a concave portion that curves inward.

Figure 5:
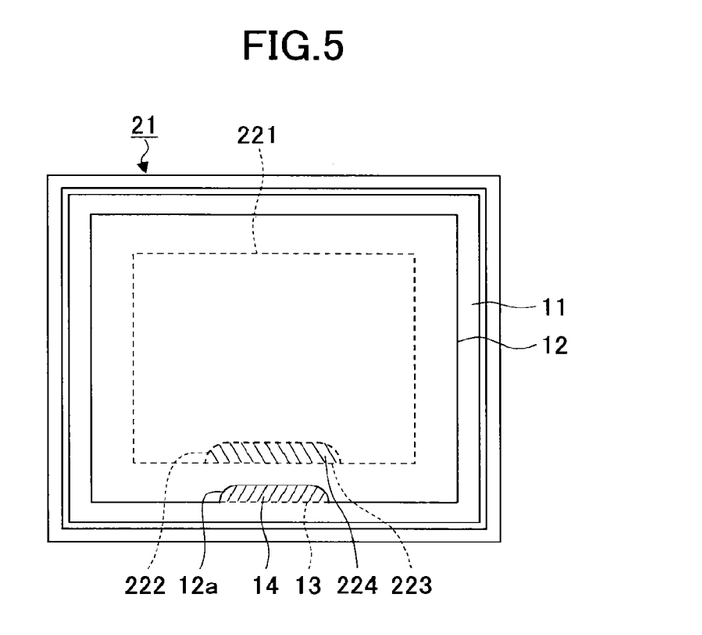
FIG. 5 is a plan view showing the positional relationship between a template according to a variation and a scribe line.

FIG. 5 is a plan view showing the positional relationship between a template according to a variation and a scribe line. In FIG. 5, the outer edge 221 of the flat surface 22a is indicated by a dashed line.

As shown in FIG. 5, the outer edge 221 of the flat surface 22a may include a concave portion 222 that curves inward. In this case, a region (a region indicated by falling diagonal strokes from top left to bottom right in FIG. 5) 224 where the glass plate 11 is difficult to be subjected to bending deformation is present over the defining part 24. This region 224 is a region surrounded by the concave portion 222 and a straight line 223 that connects both ends of the concave portion 222.

As shown in FIG. 4, when the outer edge 221 of the flat surface 22a does not have the concave portion 222 (see FIG. 5), the region 224 where the glass plate 11 is difficult to be subjected to bending deformation (see FIG. 5) is absent over the defining part 24. Therefore, it is possible to form the scribe line 12 that is deep.

Meanwhile, as shown in FIG. 5, when the outer edge 221 of the flat surface 22a includes the concave portion 222, the scribble line 12 does not overlap the region 224 where the glass plate 11 is difficult to be subjected to bending deformation. Accordingly, like in the case where the outer edge 221 of the flat surface 22a does not have the concave portion 222, it is possible to form the scribe line 12 that is deep.

The scribe line 12 shown in FIG. 4, which includes the concave portion 12a that curves inward, does not have to have the concave portion 12a. In this case, the outer edge 221 of the flat surface 22a does not have to have the concave portion 222. Because the region 224 where the glass plate 11 is difficult to be subjected to bending deformation is absent over the defining part 24, it is possible to form a deep scribe line.

Likewise, the scribe line 12 shown in FIG. 5, which includes the concave portion 12a that curves inward, does not have to have the concave portion 12a. In this case, it is possible that the outer edge 221 of the flat surface 22a includes the concave portion 222 and the scribe line does not overlap the region 224 where the glass plate 11 is difficult to be subjected to bending deformation. It is possible to form a deep scribe line.

Next, referring again to FIG. 1 and FIG. 2, a glass plate processing method using the above-described glass plate processing apparatus 10 is described. The glass plate processing method includes the cutting process of forming the scribe line 12 in the top surface 11a of the glass plate 11 by moving the cutter 20, pressed against the top surface 11a of the glass plate 11, and the template 21, supporting the bottom surface 11b of the glass plate 11, relative to each other.

In the cutting process, a portion of the glass plate 11 is supported by the flat part 22, and the cutter 20 is pressed to a predetermined position on the rest of the glass plate 11. The force to press the cutter 20 subjects the glass plate 11 to bending deformation, with the outer edge 221 of the flat surface 22a serving as a bending support. The bending deformation of the glass plate 11 is restricted by the defining part 24.

Because of the bending deformation of the glass plate 11, a tensile stress acts on the scribe line 12 behind the cutter 20 in its moving direction, so that the scribe line 12 opens to become deeper. Furthermore, because the bending deformation of the glass plate 11 is restricted by the defining part 24, it is possible to prevent breakage of the glass plate 11.

Second Embodiment

Figure 6:
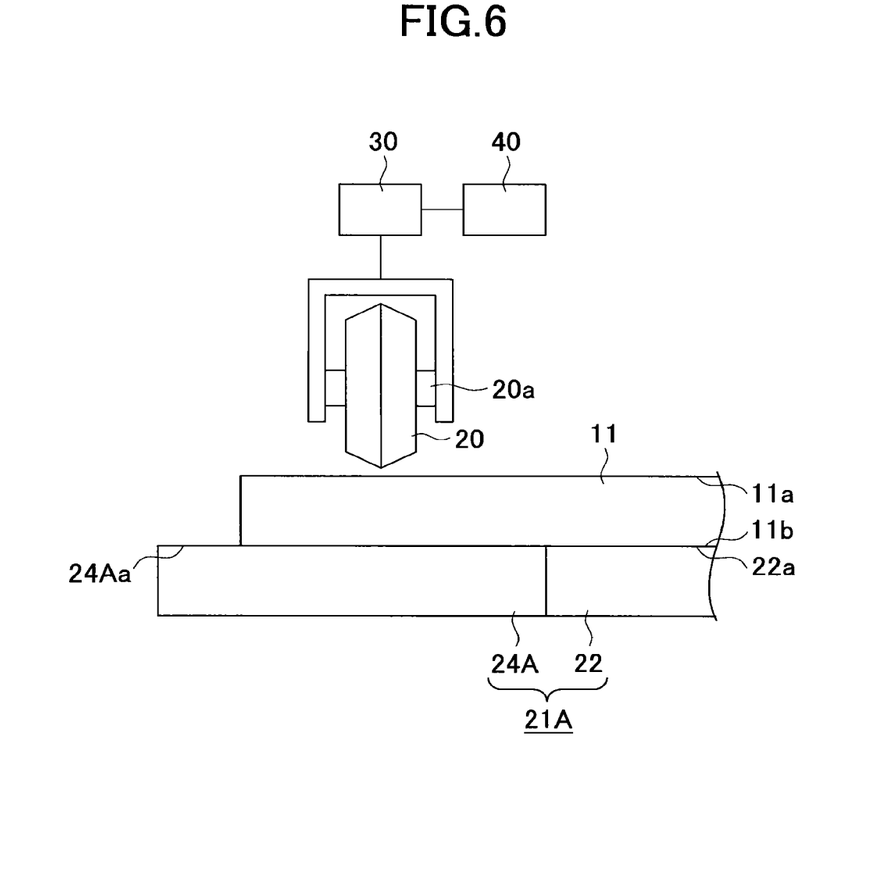
FIG. 6 is a diagram showing a glass plate processing apparatus according to a second embodiment of the present invention, showing a state before pressing a cutter.
Figure 7:
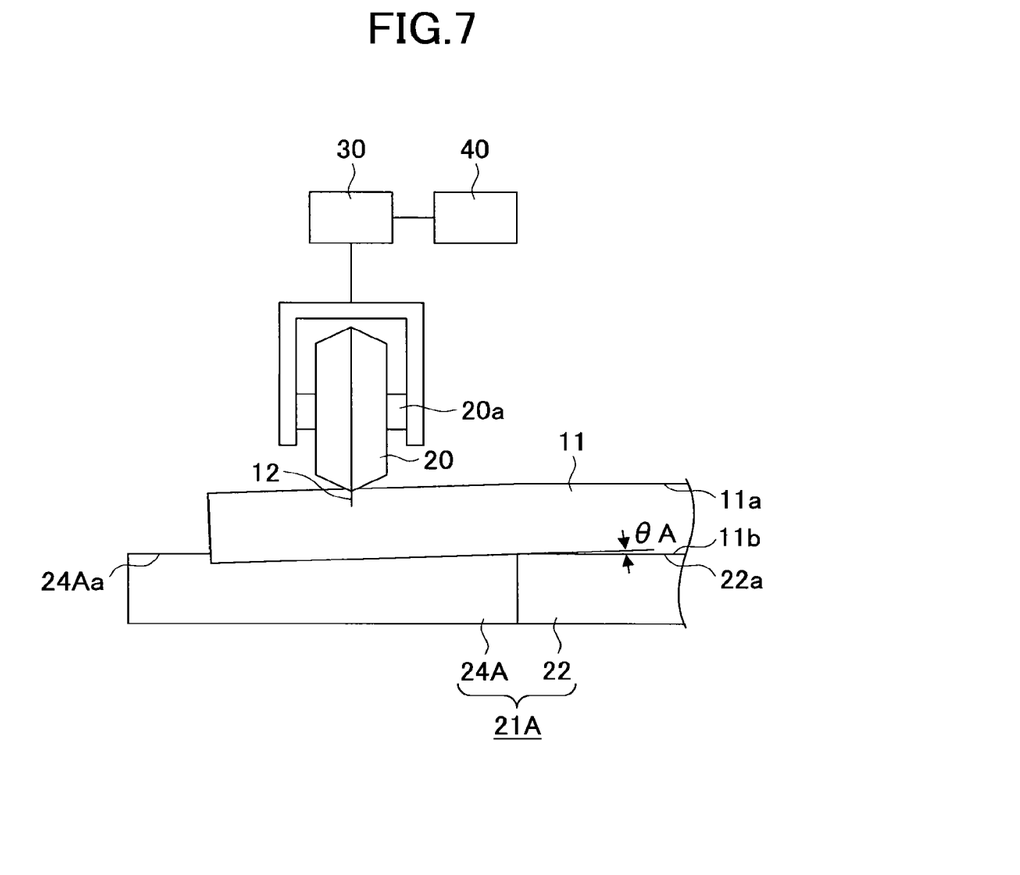
FIG. 7 is a diagram showing the glass plate processing apparatus according to the second embodiment of the present invention, showing a state when the cutter is pressed.

FIG. 6 is a diagram showing a glass plate processing apparatus according to a second embodiment of the present invention, showing a state before pressing a cutter. FIG. 7 is a diagram showing the glass plate processing apparatus according to the second embodiment of the present invention, showing a state when the cutter is pressed.

A template 21A includes a defining part 24A instead of the defining part 24 shown in FIG. 1 and FIG. 2. The defining part 24A defines the shape of the glass plate 11 due to bending deformation when the cutter 20 is pressed to a predetermined position on the glass plate 11. The bending deformation of the glass plate 11 is deformation in which the outer edge of the flat surface 22a serves as a bending support.

Because of the bending deformation of the glass plate 11, a tensile stress acts on the scribe line 12 behind the cutter 20 in its moving direction, so that the scribe line 12 opens to become deeper. Furthermore, because the bending deformation of the glass plate 11 is restricted by the defining part 24A, it is possible to prevent breakage of the glass plate 11.

The defining part 24A defines the shape of the glass plate 11 due to bending deformation by elastically deforming according to a force to press the cutter 20. Once the force to press the cutter 20 is removed, the defining part 24 returns to its original shape. Before the cutter 20 is pressed, a defining surface 24Aa may be flush with the flat surface 22a and may support the bottom surface 11b of the glass plate 11. It is possible to constantly support the entire bottom surface 11b of the glass plate 11.

When the cutter 20 is pressed, the inclination angle $\theta A$ of a portion of the glass plate 11 subjected to bending deformation relative to the flat surface 22a is, for example, 0.3° to 5°. When the inclination angle $\theta A$ is 0.3° or more, a tensile stress that acts on the scribe line 12 behind the cutter 20 in its moving direction is sufficiently high. Furthermore, when the inclination angle $\theta A$ is 5° or less, it is possible to form the scribe line 12 that is substantially perpendicular to the top surface 11a of the glass plate 11. The inclination angle $\theta A$ is preferably 0.5° or more and 4° or less. The material of the defining part 24A may be selected so that the inclination angle $\theta A$ falls within the above-described range.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Embodiments of the method and apparatus for processing a glass plate as a brittle plate are described above. It should be understood, however, that the present invention is not limited to the specifically disclosed embodiments, and variations and modifications may be made without departing from the scope of the present invention.

For example, the brittle plate of the above-described embodiments, which is a glass plate, may alternatively be a metal silicon plate or a ceramic plate.

What is claimed is:

1. A brittle plate processing method, comprising:
   having a first portion of a brittle plate supported flat on a flat part of a support member that supports a first surface of the brittle plate;
   pressing a cutter against a second surface of the brittle plate opposite to the first surface, the cutter being pressed to a predetermined position on a second portion of the brittle plate other than the first portion; and
   forming a scribe line in the second surface of the brittle plate by moving the cutter and the support member relative to each other,
   wherein, when the cutter is pressed to the predetermined position on the second portion of the brittle plate, a shape of the brittle plate due to bending deformation is defined by a defining part of the support member.

2. The brittle plate processing method as claimed in claim 1, wherein
   the first surface of the brittle plate is not supported by a defining surface of the defining part before the cutter is pressed, and is supported by the defining surface when the cutter is pressed, and
   the shape of the brittle plate due to the bending deformation is defined by a shape of the defining surface.

3. The brittle plate processing method as claimed in claim 2, wherein an inclination angle of the defining surface relative to a flat surface of the flat part on which surface the brittle plate is supported is 0.3° to 5°.

4. The brittle plate processing method as claimed in claim 1, wherein the defining part defines the shape of the brittle plate due to the bending deformation by elastically deforming according to a force to press the cutter.

5. The brittle plate processing method as claimed in claim 1, wherein the scribe line includes a concave portion that curves toward the flat part in a plan view.

6. The brittle plate processing method as claimed in claim 1, wherein an outer edge of a flat surface of the flat part on which surface the brittle plate is supported is devoid of a concave portion that curves inward.

7. The brittle plate processing method as claimed in claim 1, wherein the defining part surrounds an outer edge of the flat part.

8. A brittle plate processing apparatus that forms a scribe line in a first surface of a brittle plate, the brittle plate processing apparatus comprising:
- a cutter that is pressed against the first surface of the brittle plate;
- a support member configured to support a second surface of the brittle plate opposite to the first surface, the support member including
  - a flat part configured to have a first portion of the brittle plate supported flat thereon; and
  - a defining part configured to define a shape of the brittle plate due to bending deformation when the cutter is pressed to a predetermined position on a second portion of the brittle plate other than the first portion;
- a movement unit configured to move the cutter and the support member relative to each other; and
- a controller configured to control the movement unit.

9. The brittle plate processing apparatus as claimed in claim 8, wherein the defining part includes a defining surface that does not support the second surface of the brittle plate before the cutter is pressed and supports the second surface of the brittle plate when the cutter is pressed, and is configured to define the shape of the brittle plate due to the bending deformation by a shape of the defining surface.

10. The brittle plate processing apparatus as claimed in claim 9, wherein an inclination angle of the defining surface relative to a flat surface of the flat part which surface is configured to support the brittle plate is 0.3° to 5°.

11. The brittle plate processing apparatus as claimed in claim 8, wherein the defining part is configured to define the shape of the brittle plate due to the bending deformation by elastically deforming according to a force to press the cutter.

12. The brittle plate processing apparatus as claimed in claim 8, wherein an outer edge of a flat surface of the flat part which surface is configured to support the brittle plate is devoid of a concave portion that curves inward.

13. The brittle plate processing apparatus as claimed in claim 8, wherein
- an outer edge of a flat surface of the flat part which surface is configured to support the brittle plate includes a concave portion that curves inward, and
- the controller is configured to control the movement unit so as to prevent the scribe line from overlapping a region surrounded by the concave portion of the outer edge and a straight line connecting both ends of the concave portion of the outer edge in a plan view.

14. The brittle plate processing apparatus as claimed in claim 8, wherein the defining part surrounds an outer edge of the flat part.

* * * * *